United States Patent
Bestgen et al.

(10) Patent No.: US 7,743,052 B2
(45) Date of Patent: Jun. 22, 2010

(54) METHOD AND APPARATUS FOR PROJECTING THE EFFECT OF MAINTAINING AN AUXILIARY DATABASE STRUCTURE FOR USE IN EXECUTING DATABASE QUERIES

(75) Inventors: Robert Joseph Bestgen, Rochester, MN (US); James Michael Flanagan, Rochester, MN (US); Michael Donald Pfeifer, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 177 days.

(21) Appl. No.: 11/353,515

(22) Filed: Feb. 14, 2006

(65) Prior Publication Data

US 2007/0192372 A1    Aug. 16, 2007

(51) Int. Cl.
*G06F 7/00*  (2006.01)
(52) U.S. Cl. .............. 707/715; 707/721
(58) Field of Classification Search ........... None
See application file for complete search history.

(56) References Cited

U.S. PATENT DOCUMENTS

| | | | |
|---|---|---|---|
| 5,913,206 A * | 6/1999 | Chaudhuri et al. | 707/2 |
| 5,926,813 A * | 7/1999 | Chaudhuri et al. | 707/5 |
| 6,223,171 B1 * | 4/2001 | Chaudhuri et al. | 707/2 |
| 2003/0088541 A1 | 5/2003 | Zilio et al. | |
| 2003/0088546 A1 | 5/2003 | Brown et al. | |
| 2003/0093408 A1 * | 5/2003 | Brown et al. | 707/2 |
| 2005/0033730 A1 * | 2/2005 | Chaudhuri et al. | 707/1 |
| 2005/0187917 A1 | 8/2005 | Lawande et al. | |
| 2005/0203940 A1 | 9/2005 | Farrar et al. | |
| 2005/0234900 A1 | 10/2005 | Bossman et al. | |

OTHER PUBLICATIONS

Products: Application Performance Management: insure/INDEX, http://www.centerfieldtechnology.com/tools/insureindex.asp.
DB2 Autonomic Computing: Index Advisor, http://d25web1.torolab.ibm.com/function/dbt/SMART.nsf/0/2E944E6080C2036285256C5.

* cited by examiner

*Primary Examiner*—Cam Y Truong
*Assistant Examiner*—Dung K Chau
(74) *Attorney, Agent, or Firm*—Roy W. Truelson

(57) ABSTRACT

A database management system maintains a record of queries which can be executed against the database. For a given auxiliary database structure, an advisory function automatically reviews the query record and identifies those queries which might execute with greater efficiency using the auxiliary database structure, presenting analytical information to the user. Preferably, the auxiliary database structure is an index, and the information is used for determining whether to include the index in the database definition. Preferably, a query optimizer records potentially useful indexes when considering multiple alternative database optimizations, and this information is later retrieved to identify queries which would benefit from an index.

12 Claims, 8 Drawing Sheets

US 7,743,052 B2

METHOD AND APPARATUS FOR PROJECTING THE EFFECT OF MAINTAINING AN AUXILIARY DATABASE STRUCTURE FOR USE IN EXECUTING DATABASE QUERIES

CROSS REFERENCE TO RELATED APPLICATION

The present invention is related to U.S. patent application Ser. No. 11/239,617 filed Sep. 29, 2005, entitled "CONTINUAL GENERATION OF INDEX ADVICE", which is herein incorporated by reference.

FIELD OF THE INVENTION

The present invention relates generally to digital data processing, and more particularly to the generation and execution of database queries in a digital computer system.

BACKGROUND OF THE INVENTION

In the latter half of the twentieth century, there began a phenomenon known as the information revolution. While the information revolution is a historical development broader in scope than any one event or machine, no single device has come to represent the information revolution more than the digital electronic computer. The development of computer systems has surely been a revolution. Each year, computer systems grow faster, store more data, and provide more applications to their users.

A modern computer system typically comprises hardware in the form of one or more central processing units (CPU) for processing instructions, memory for storing instructions and other data, and other supporting hardware necessary to transfer information, communicate with the external world, and so forth. From the standpoint of the computer's hardware, most systems operate in fundamentally the same manner. Processors are capable of performing a limited set of very simple operations, such as arithmetic, logical comparisons, and movement of data from one location to another. But each operation is performed very quickly. Programs which direct a computer to perform massive numbers of these simple operations give the illusion that the computer is doing something sophisticated. What is perceived by the user as a new or improved capability of a computer system is made possible by performing essentially the same set of very simple operations, but doing it much faster. Therefore continuing improvements to computer systems require that these systems be made ever faster.

The overall speed at which a computer system performs day-to-day tasks (also called "throughput") can be increased by making various improvements to the computer's hardware design, which in one way or another increase the average number of simple operations performed per unit of time. The overall speed of the system can also be increased by making algorithmic improvements to the system design, and particularly, to the design of software executing on the system. Unlike most hardware improvements, many algorithmic improvements to software increase the throughput not by increasing the average number of operations executed per unit time, but by reducing the total number of operations which must be executed to perform a given task.

Complex systems may be used to support a variety of applications, but one common use is the maintenance of large databases, from which information may be obtained. Large databases usually support some form of database query for obtaining information which is extracted from selected database fields and records. Such queries can consume significant system resources, particularly processor resources, and the speed at which queries are performed can have a substantial influence on the overall system throughput.

Conceptually, a database may be viewed as one or more tables of information, each table having a large number of entries (analogous to rows of a table), each entry having multiple respective data fields (analogous to columns of the table). The function of a database query is to find all rows, for which the data in the columns of the row matches some set of parameters defined by the query. A query may be as simple as matching a single column field to a specified value, but is often far more complex, involving multiple field values and logical conditions. A query may also involve multiple tables (referred to as a "join" query), in which the query finds all sets of N rows, one row from each respective one of N tables joined by the query, where the data from the columns of the N rows matches some set of query parameters.

Execution of a query involves retrieving and examining records in the database according to some search strategy. For any given logical query, not all search strategies are equal. Various factors may affect the choice of optimum search strategy and the time or resources required to execute the strategy.

For example, one of the factors affecting query execution is the sequential order in which multiple conditions joined by a logical operator, such as AND or OR, are evaluated. The sequential order of evaluation is significant because the first evaluated condition is evaluated with respect to all the entries in a database table, but a later evaluated condition need only be evaluated with respect to some subset of records which were not eliminated from the determination earlier. Therefore, as a general rule, it is desirable to evaluate those conditions which are most selective first. Query execution may be affected by other and additional factors.

In particular, query execution can be significantly affected by the use of certain auxiliary database structures. An auxiliary database structure is a structured collection of information derived from one or more tables of the database, which may be used to more efficiently execute a database query. One well known type of auxiliary database structure is an index. An index is conceptually a sorting of entries in a database table according to the value of one or more corresponding fields (columns). If a query includes an indexed value as a condition, it may be advantageous to use the index to determine responsive records, rather than examine each record in the applicable table.

Auxiliary database structures, such as indexes, are typically defined by a database designer, administrator or similar person. A well-designed database typically contains various auxiliary database structures to support query execution or for other purposes. Once defined, these structures are automatically maintained by database management software as changes are made to the underlying database records.

To support database queries, large databases typically include a query engine which executes the queries according to some automatically selected search (execution) strategy, using the known characteristics of the database and other factors. Some large database applications further have query optimizers which construct search strategies, and save the query and its corresponding search strategy for reuse. In such systems, it may be possible to construct and save multiple different query execution strategies for a single query.

Where an auxiliary database structure, such as an index, exists and is useful in executing a query, a query optimizer may construct an execution strategy to take advantage of the existing auxiliary database structure as a shortcut to executing the query. However, in many complex queries, it is desirable or essential to employ some auxiliary database structure in executing the query, but no such defined auxiliary database structure already exists. The optimizer will generally choose an alternative execution strategy which does not require the auxiliary database structure, and which may consume significantly more resource. In these cases, the query optimizer may generate an execution strategy which itself constructs the needed auxiliary database structure as a temporary object for use in executing the query, but this also involves further expenditure of resource.

While there are obvious benefits to maintaining auxiliary database structures, the maintenance of such structures is not free. Every auxiliary database structure which is defined by the database designer for supporting queries and the like must be maintained concurrently with the data in the database tables, i.e., as updates to database table records are made, the applicable auxiliary database structure or structures must likewise be updated so that the data contained therein agrees with the underlying data in the database tables, from which it was derived. Updating numerous auxiliary database structures is a significant overhead cost of maintaining a database. As more auxiliary database structures are added to the database definition, this overhead burden increases. For these reasons, an auxiliary database structure should not be defined to the database unless the resource savings from query execution or other functions which use the auxiliary database structure is sufficiently large to justify the overhead cost of maintaining the auxiliary database structure.

If a database designer, administrator or similar person is presented with a hypothetical or actual auxiliary database structure for inclusion in a database definition, it is difficult to predict the effect of the presence of such an auxiliary database structure on query execution performance, and therefore difficult to determine whether the overhead burden of the auxiliary database structure will be justified. Although not necessarily recognized in the art, a need exists for improved techniques for determining auxiliary database structures for inclusion in the definition of a database, an in particular, a need exists for techniques for projecting the effect of the presence of an auxiliary database structure on query execution performance.

SUMMARY OF THE INVENTION

A database management system for a structured database maintains a record of queries which can be executed against the database. For a given actual or hypothetical auxiliary database structure, an advisory function automatically reviews the query record and identifies those queries in the query record which might execute with greater efficiency using the auxiliary database structure. This information might be presented directly to a user, or used as a basis for further automated analysis which is presented to a user. Preferably, the information is used for determining whether to include the auxiliary database structure in the database definition.

In the preferred embodiment, a query optimizer function in the database management system automatically generates multiple potential query execution strategies ("plans"), and selects a best strategy for use. In some cases, a potential strategy is not selected because it would require an auxiliary database structure which is not present, and would be too expensive to generate for temporary use. In other cases, a potential strategy which generates an auxiliary database structure for temporary use is selected, notwithstanding the cost of generating the structure. Either event is recorded in the record of database queries, called a "plan cache". By retrieving and analyzing these events, an advisory function can determine which queries are likely to benefit from the presence of an auxiliary database structure, and present this data to the user. Optionally, the data presented to the user can be further refined to automatically generate additional data from the identification of specific queries. For example, as an optional enhancement an advisor can automatically determine the frequency of execution of each affected query, automatically estimate a cost saving from implementing an auxiliary database structure for each affected query, and so forth.

In the preferred embodiment, the auxiliary database structure is an index, and is described as such in the detailed description which follows. However, it will be understood that other auxiliary database structures, or auxiliary database structures in addition to indexes, might alternatively be the subject of analysis according to the present invention.

By automatically determining those queries which might benefit from the presence of an actual or hypothetical database structure, a database designer, administrator or similar user has useful information for making the decision to include an auxiliary database structure in the database definition. Providing the user with better information concerning the effect of inclusion of the auxiliary database structure enables the user to make more informed design decisions, including such auxiliary database structures as are justified by the query execution cost savings, and not including those structures which would not be expected to provide sufficient query execution cost savings. These more informed design decisions improve the overall performance efficiency of the database.

The details of the present invention, both as to its structure and operation, can best be understood in reference to the accompanying drawings, in which like reference numerals refer to like parts, and in which:

DETAILED DESCRIPTION OF THE PREFERRED EMBODIMENTS

Figure 1:
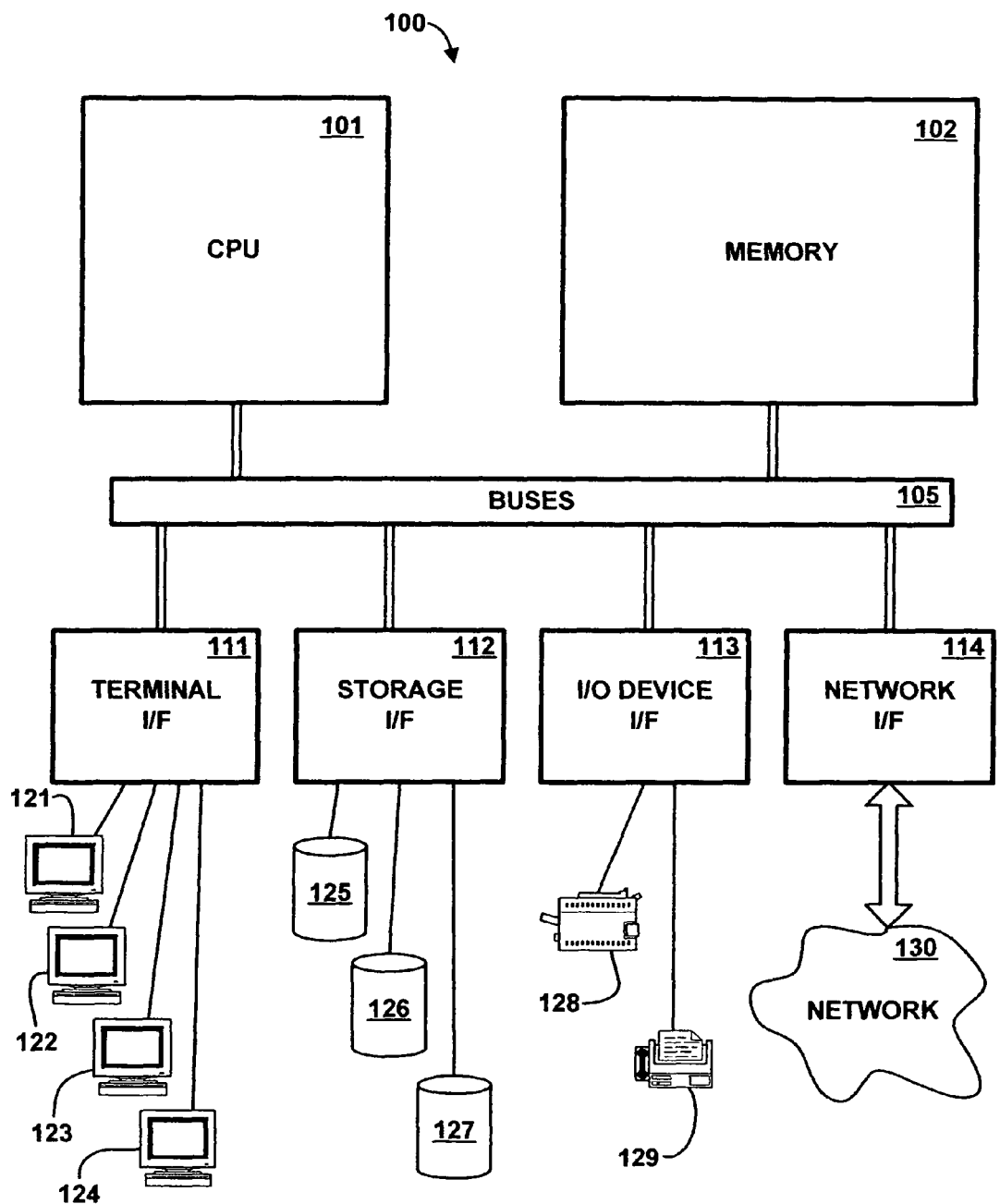
FIG. 1 is a high-level block diagram of the major hardware components of a computer system for executing database queries and automatically projecting the effect of maintaining an actual or hypothetical auxiliary database structure, according to the preferred embodiment of the present invention.

Referring to the Drawing, wherein like numbers denote like parts throughout the several views, FIG. 1 is a high-level representation of the major hardware components of a computer system 100 for use in generating and executing database queries, and automatically projecting the effect of including an actual or hypothetical auxiliary database structure in the database definition, according to the preferred embodiment of the present invention. CPU 101 is at least one general-purpose programmable processor which executes instructions and processes data from main memory 102. Main memory 102 is preferably a random access memory using any of various memory technologies, in which data is loaded from storage or otherwise for processing by CPU 101.

One or more communications buses 105 provide a data communication path for transferring data among CPU 101, main memory 102 and various I/O interface units 111-114, which may also be known as I/O processors (IOPs) or I/O adapters (IOAs). The I/O interface units support communication with a variety of storage and I/O devices. For example, terminal interface unit 111 supports the attachment of one or more user terminals 121-124. Storage interface unit 112 supports the attachment of one or more direct access storage devices (DASD) 125-127 (which are typically rotating magnetic disk drive storage devices, although they could alternatively be other devices, including arrays of disk drives configured to appear as a single large storage device to a host). I/O device interface unit 113 supports the attachment of any of various other types of I/O devices, such as printer 128 and fax machine 129, it being understood that other or additional types of I/O devices could be used. Network interface 114 supports a connection to an external network 130 for communication with one or more other digital devices. Network 130 may be any of various local or wide area networks known in the art. For example, network 130 may be an Ethernet local area network, or it may be the Internet. Additionally, network interface 114 might support connection to multiple networks.

It should be understood that FIG. 1 is intended to depict the representative major components of system 100 at a high level, that individual components may have greater complexity than represented in FIG. 1, that components other than or in addition to those shown in FIG. 1 may be present, and that the number, type and configuration of such components may vary, and that a large computer system will typically have more components than represented in FIG. 1. Several particular examples of such additional complexity or additional variations are disclosed herein, it being understood that these are by way of example only and are not necessarily the only such variations.

Although only a single CPU 101 is shown for illustrative purposes in FIG. 1, computer system 100 may contain multiple CPUs, as is known in the art. Although main memory 102 is shown in FIG. 1 as a single monolithic entity, memory 102 may in fact be distributed and/or hierarchical, as is known in the art. E.g., memory may exist in multiple levels of caches, and these caches may be further divided by function, so that one cache holds instructions while another holds non-instruction data which is used by the processor or processors. Memory may further be distributed and associated with different CPUs or sets of CPUs, as is known in any of various so-called non-uniform memory access (NUMA) computer architectures. Although communications buses 105 are shown in FIG. 1 as a single entity, in fact communications among various system components is typically accomplished through a complex hierarchy of buses, interfaces, and so forth, in which higher-speed paths are used for communications between CPU 101 and memory 102, and lower speed paths are used for communications with I/O interface units 111-114. Buses 105 may be arranged in any of various forms, such as point-to-point links in hierarchical, star or web configurations, multiple hierarchical buses, parallel and redundant paths, etc. For example, as is known in a NUMA architecture, communications paths are arranged on a nodal basis. Buses may use, e.g., an industry standard PCI bus, or any other appropriate bus technology. While multiple I/O interface units are shown which separate buses 105 from various communications paths running to the various I/O devices, it would alternatively be possible to connect some or all of the I/O devices directly to one or more system buses.

Computer system 100 depicted in FIG. 1 has multiple attached terminals 121-124, such as might be typical of a multi-user "mainframe" computer system. Typically, in such a case the actual number of attached devices is greater than those shown in FIG. 1, although the present invention is not limited to systems of any particular size. User workstations or terminals which access computer system 100 might also be attached to and communicate with system 100 over network 130. Computer system 100 may alternatively be a single-user system, typically containing only a single user display and keyboard input. Furthermore, while the invention herein is described for illustrative purposes as embodied in a single computer system, the present invention could alternatively be implemented using a distributed network of computer systems in communication with one another, in which different functions or steps described herein are performed on different computer systems.

While various system components have been described and shown at a high level, it should be understood that a typical computer system contains many other components not shown, which are not essential to an understanding of the present invention. In the preferred embodiment, computer system 100 is a computer system based on the IBM i/Series™ architecture, it being understood that the present invention could be implemented on other computer systems.

Figure 2:
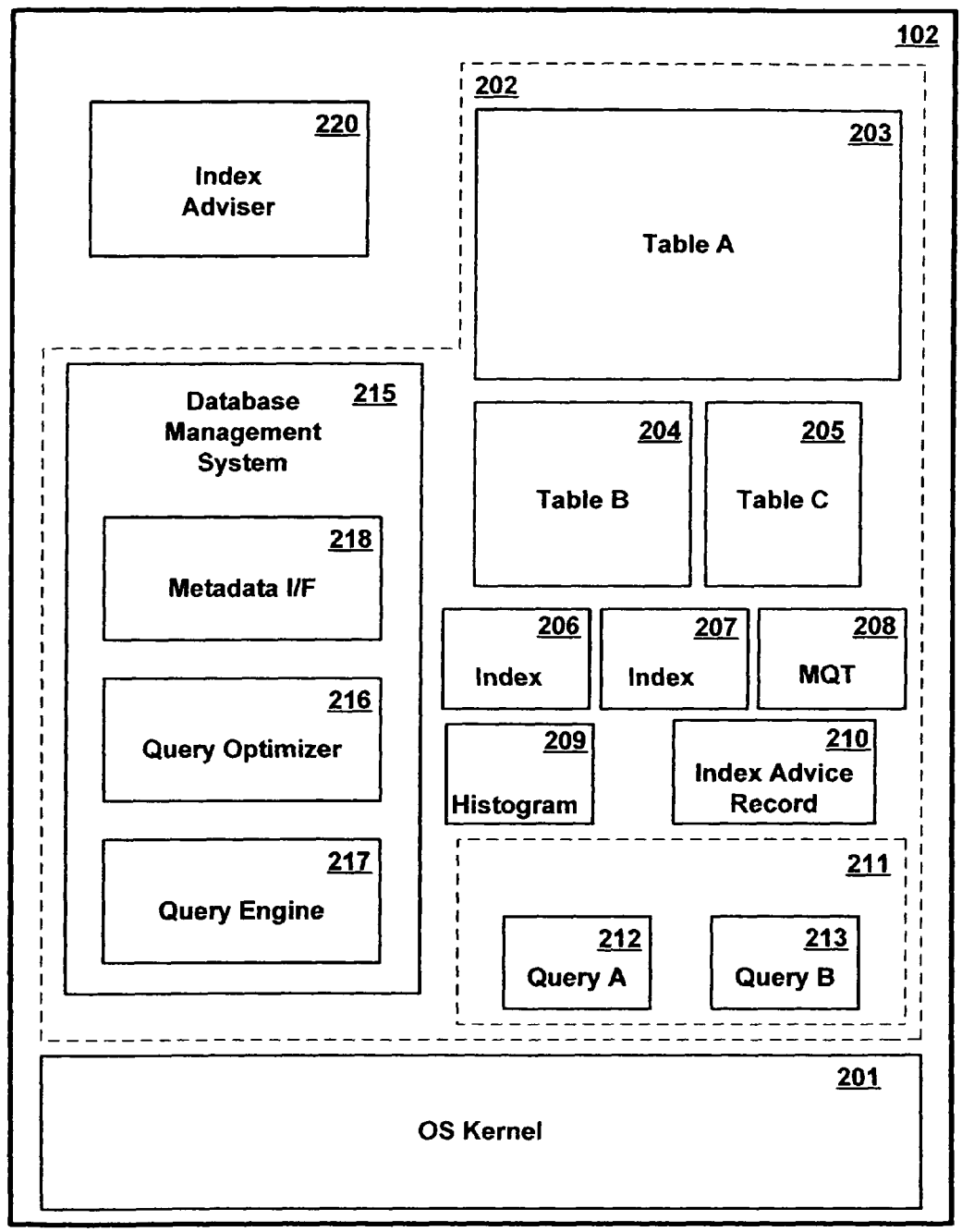
FIG. 2 is a conceptual illustration of the major software components of a computer system for executing database queries and automatically projecting the effect of maintaining an auxiliary database structure, according to the preferred embodiment.

FIG. 2 is a conceptual illustration of the major software components of system 100 in memory 102. Operating system kernel 201 is executable code and state data providing various low-level software functions, such as device interfaces, management of memory pages, management and dispatching of multiple tasks, etc. as is well-known in the art. A structured database 202 contains data which is maintained by computer system 100 and for which the system provides access to one or more users, who may be directly attached to system 100 or may be remote clients who access system 100 through a network using a client/server access protocol.

Database 202 contains one or more tables 203-205 (of which three are shown in FIG. 2), each having a plurality of entries or records, each entry containing at least one (and usually many) fields, as is well known in the art. Database tables 203-205 might contain almost any type of data which is provided to users by a computer system. Associated with the database tables are one or more auxiliary data structures 206-213, also sometimes referred to as metadata. Auxiliary data structures characterize the structure of the database and data therein, and are useful in various tasks involved in database management, particularly in executing queries against the database. Examples of auxiliary data structures include database indexes 206, 207, materialized query table (MQT) 208, histogram 209, index advice record 210, and plan cache 211, containing saved query objects 212-213, it being understood that other types of metadata may exist.

Database management system 215 provides basic functions for the management of database 202. Database management system 215 may theoretically support an arbitrary number of database tables, which may or may not have related information, although only three tables are shown in FIG. 2. Database management system 215 preferably allows users to perform basic database operations, such as defining a database, altering the definition of the database, creating, editing and removing records in the database, viewing records in the database, defining database auxiliary data structures such as indexes and materialized query tables, and so forth. Among the functions supported by database management system 215 is the making of queries against data in database tables 203-205. Query support functions in database management system 215 include query optimizer 216 and query engine 217. In the preferred embodiment, database management system 215 includes a metadata interface 218 having one or more application programming interfaces (APIs) by which external applications can access data in one or more auxiliary data structures 206-213, and particularly can access data in query objects 212-213 and in index advice record 210. Database management system 215 may further contain any of various more advanced database functions. In the preferred embodiment, database management system 215 implements a structured query language (SQL) query protocol, it being understood that a database management system might alternatively query and structure data according to some other protocol. Although database management system 215 is represented in FIG. 2 as an entity separate from operating system kernel 201, it will be understood that in some computer architectures various database management functions are integrated with the operating system.

Query optimizer 216 generates query execution strategies for performing database queries. As is known in the database art, the amount of time or resource required to perform a complex query on a large database can vary greatly, depending on various factors, such as the availability of an index or other auxiliary data structure, the amount of resources required to evaluate each condition, and the expected selectivity (i.e., number of records eliminated from consideration) of the various logical conditions. Optimizer 216 determines an optimal execution strategy according to any optimizing algorithm, now known or hereafter developed, and generates an execution strategy, also known as an "access plan" or "plan", according to the determination. The execution strategy is a defined series of steps for performing the query, and thus is, in effect, a computer program. The optimizer 216 which generates the execution strategy performs a function analogous to that of a compiler, although the execution strategy data is not necessarily executable-level code. It is, rather, a higher-level series of statements which are interpreted and executed by query engine 217.

A query can be saved as a persistent storage object in memory, and can be written to disk or other storage. Once created by optimizer 216, a query execution strategy can be saved with the query as part of the persistent storage object. The query can be invoked, and a saved query strategy re-used (re-executed), many times. For a given query, it is possible to generate and save one, or optionally multiple, query execution strategies, each optimized for different respective conditions. E.g., where a query contains an imported ("host") variable in one of its conditions, the value of which is specified at the time the query is executed, different query execution strategies could be used for different values of the imported variable. Different query execution strategies might also be used for different environmental parameters under which the query is to be executed. In addition to saving one or more query execution strategies, certain metadata with respect to each query execution strategy can be saved, such as the conditions for which the strategy was generated and historical data concerning the execution of the strategy.

One or more auxiliary database structures, such as indexes 206, 207, materialized query table 208 or histogram 209, may be specified by a database designer, administrator, or similar person as part of the database definition, i.e. a data structure which is part of the database and is available for use by users accessing the database. Database management system 215 automatically maintains such defined auxiliary database structures concurrently with changes made to records in database tables 203-205. A query execution strategy will often use a defined auxiliary database structure such as indexes 206, 207 or MQT 208 to execute a query. In some cases, it is necessary or desirable to use such a structure where no defined structure exists. A query optimizer may optionally generate a query execution strategy which builds a temporary auxiliary data structure as an intermediate step in executing the query.

The collection of saved queries, query execution strategies, saved latent indexes, MQT's and so forth, and associated data, is loosely referred to as the "plan cache". FIG. 2 represents plan cache 211, containing persistent storage objects Query A 212 and Query B 213. Although two query objects are represented for illustrative purposes in FIG. 2, it will be understood that the actual number of such entities may vary, that typically a large computer system contains a much larger number of query objects, that each query object may contain or be associated with zero, one, or more than one execution strategies. Although these are referred to herein as "query objects", the use of the term "object" is not meant to imply that database management system 215 or other components are necessarily programmed using so-called object-oriented programming techniques, or that the query object necessarily has the attributes of an object in an object-oriented programming environment, although it would be possible to implement them using object-oriented programming constructs.

Generally, query optimizer 216 constructs a query execution strategy by considering multiple possible strategies for executing the query, and choosing a best one according to some evaluation criteria. The choice of a best strategy will depend on the presence of certain auxiliary data structures. In some cases, the optimizer will determine that, had a particular index been present, it would have chosen a different, more efficient strategy. In such cases, the optimizer may make a record of this determination in index advice record 210. Index advice record 210 can be used for analysis of the database, and as a basis for determining possible indexes to be added to the database definition, as described further herein.

Although one database 202 having three database tables 203-205, two indexes 206, 207, one MQT 208 one histogram 209, and one index advice record 210 are shown in FIG. 2, the number of such entities may vary, and could be much larger. The computer system may contain multiple databases, each database may contain multiple tables, and each database may have associated with it multiple indexes, MQTs, histograms, or other auxiliary data structures not illustrated. Alternatively, some entities represented in FIG. 2 might not be present in all databases; for example, some databases might not contain materialized query tables or the like. Additionally, database 202 may be logically part of a larger distributed database which is stored on multiple computer systems. Although database management system 215 is represented in FIG. 2 as part of database 202, the database management system, being executable code, is sometimes considered an entity separate from the "database", i.e., the data.

An external index advisor analytical tool application 220 accesses data in index advice record 210 and plan cache 211, to find potential indexes for addition to the database definition, and to project the effect of adding indexes to the database definition. The operation of this index advisor is described in greater detail herein. In the preferred embodiment, index advisor 220 is a separate application external to database management system 215 which accesses database auxiliary data structures using metadata interface 218. Index advisor 220 could alternatively be a function or set of functions integrated into database management system 215.

In addition to database management system 215 and index advisor 220, one or more user applications (not shown) may access data in database tables 203-205 to perform tasks on behalf of one or more users, and may use defined auxiliary database structures to do so. Such user applications may execute on computer system 100, or may access the database from remote systems. Such user applications may include, e.g., personnel records, accounting, code development and compilation, mail, calendaring, or any of thousands of user applications.

Various software entities are represented in FIG. 2 as being separate entities or contained within other entities. However, it will be understood that this representation is for illustrative purposes only, and that particular modules or data entities could be separate entities, or part of a common module or package of modules. Furthermore, although a certain number and type of software entities are shown in the conceptual representation of FIG. 2, it will be understood that the actual number of such entities may vary, and in particular, that in a complex database server environment, the number and complexity of such entities is typically much larger. Additionally, although software components 202-213, 215-218 and 220 are depicted in FIG. 2 on a single computer system 100 for completeness of the representation, it is not necessarily true that all programs, functions and data will be present on a single computer system or will be performed on a single computer system. In particular, index advisor 220 may be located on a system separate from database 202.

While the software components of FIG. 2 are shown conceptually as residing in memory 102, it will be understood that in general the memory of a computer system will be too small to hold all programs and data simultaneously, and that information is typically stored in data storage devices 125-127, comprising one or more mass storage devices such as rotating magnetic disk drives, and that the information is paged into memory by the operating system as required. In particular, database tables 203-205 are typically much too large to be loaded into memory, and typically only a small portion of the total number of database records is loaded into memory at any one time. The full database 202 is typically recorded in disk storage 125-127. Furthermore, it will be understood that the conceptual representation of FIG. 2 is not meant to imply any particular memory organizational model, and that system 100 might employ a single address space virtual memory, or might employ multiple virtual address spaces which overlap.

Figure 3:
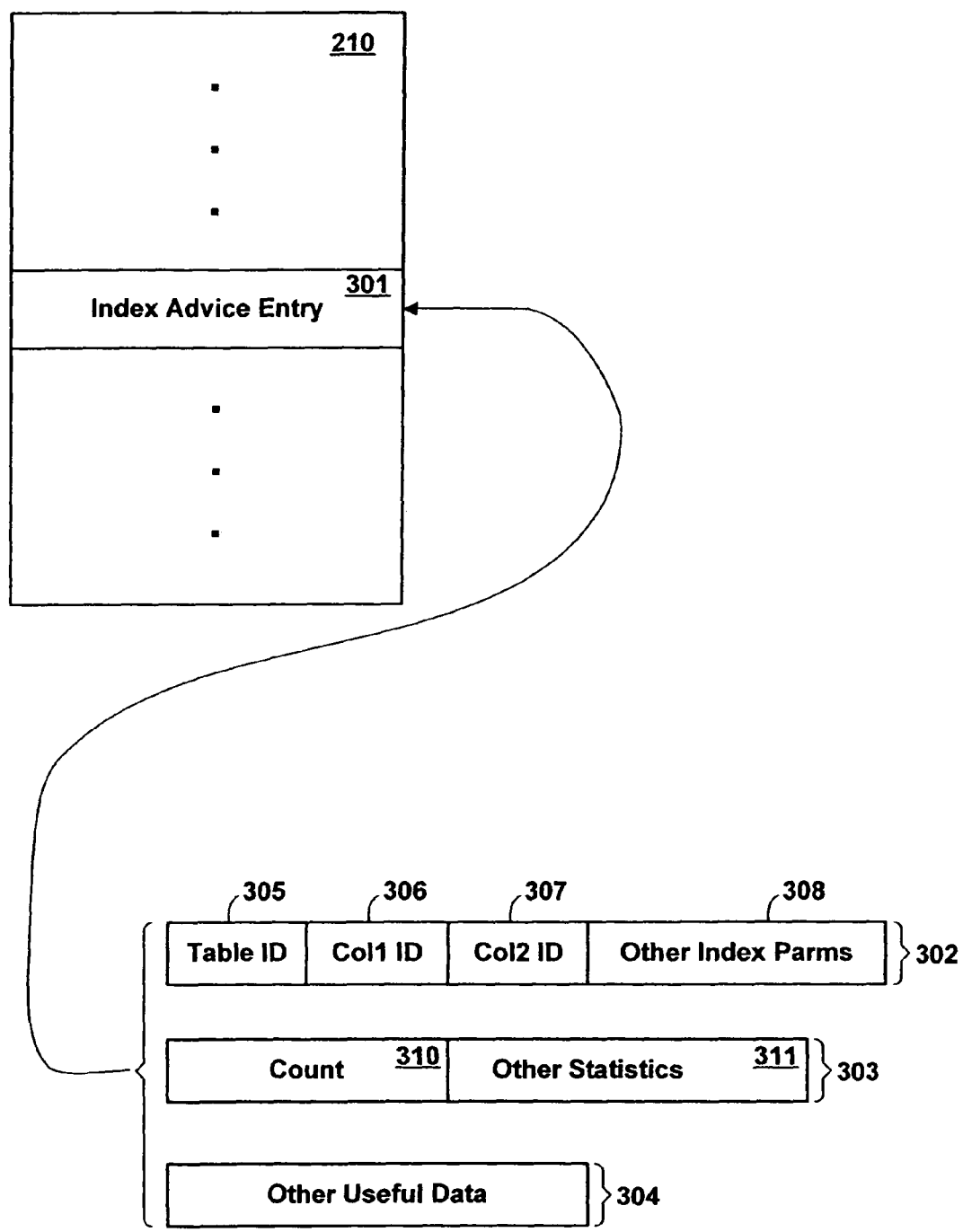
FIG. 3 is a conceptual representation of an index advice record, according to the preferred embodiment.

FIG. 3 is a conceptual representation of an index advice record 210, according to the preferred embodiment. Index advice record 210 is preferably a database table in SQL form, against which SQL queries can be run using standard database query tools, although index advice could alternatively be stored in some other format, and the present invention does not necessarily require the presence of an index advice record. Index advice record 210 contains one or more entries 301 (conceptually represented as rows of a table), each entry corresponding to a respective index which has been predicted by the optimizer 216 to be of some value in executing at least one query. Each entry 301 contains a plurality of fields, grouped as an index definition portion 302, a statistical portion 303, and optional additional data 304.

Index definition portion 302 contains fields which define the index to which the index entry 301 corresponds. Index definition portion 302 preferably contains a table identifier 305 identifying a table from database tables 203-205 to which the index pertains; one or more column identifiers 306-307 (of which two are represented in FIG. 3) identifying columns from the applicable database table which are to be used as key values for the index; and may contain one or more additional index parameters 308.

Statistical portion 303 contains cumulative statistical information concerning the index or queries which caused the index entry to be generated. In the preferred embodiment, statistical portion includes an advice count field 310 containing a count of the number of times a query has been executed which triggers the index advice, i.e., the number of times that one or more queries, for which the optimizer has determined that the corresponding index would be helpful in execution, have been executed. Statistical portion 303 may include additional fields of useful statistics 311, such as an average (or cumulative) cost of running the applicable queries, a maximum cost of running the queries, a timestamp representing the most recent applicable query execution, or other fields.

Optional additional data 304 may include any further data which may be helpful to a user in analyzing the desirability of the subject index. For example, additional data 304 might include a cost estimate for generating the index; a reason indicating why the most recently executed query recommended the index, and other potentially useful data.

The form and use of an index advice record is described in U.S. patent application Ser. No. 11/239,617 filed Sep. 29, 2005, entitled "CONTINUAL GENERATION OF INDEX ADVICE", which is herein incorporated by reference.

In the preferred embodiment, index advice record 210 does not contain data identifying individual queries which advised the index or their attributes. Preferably, such information is obtained by accessing data in the query objects 212, 213 themselves, as explained in further detail herein. However, it would alternatively be possible to structure index advice record 210 so that such data is available directly from the index advice record, and that the data described below is obtained directly from the index advice record. For example, the index advice record might be structured as multiple SQL tables, including an SQL table containing entries corresponding to queries.

Figure 4:
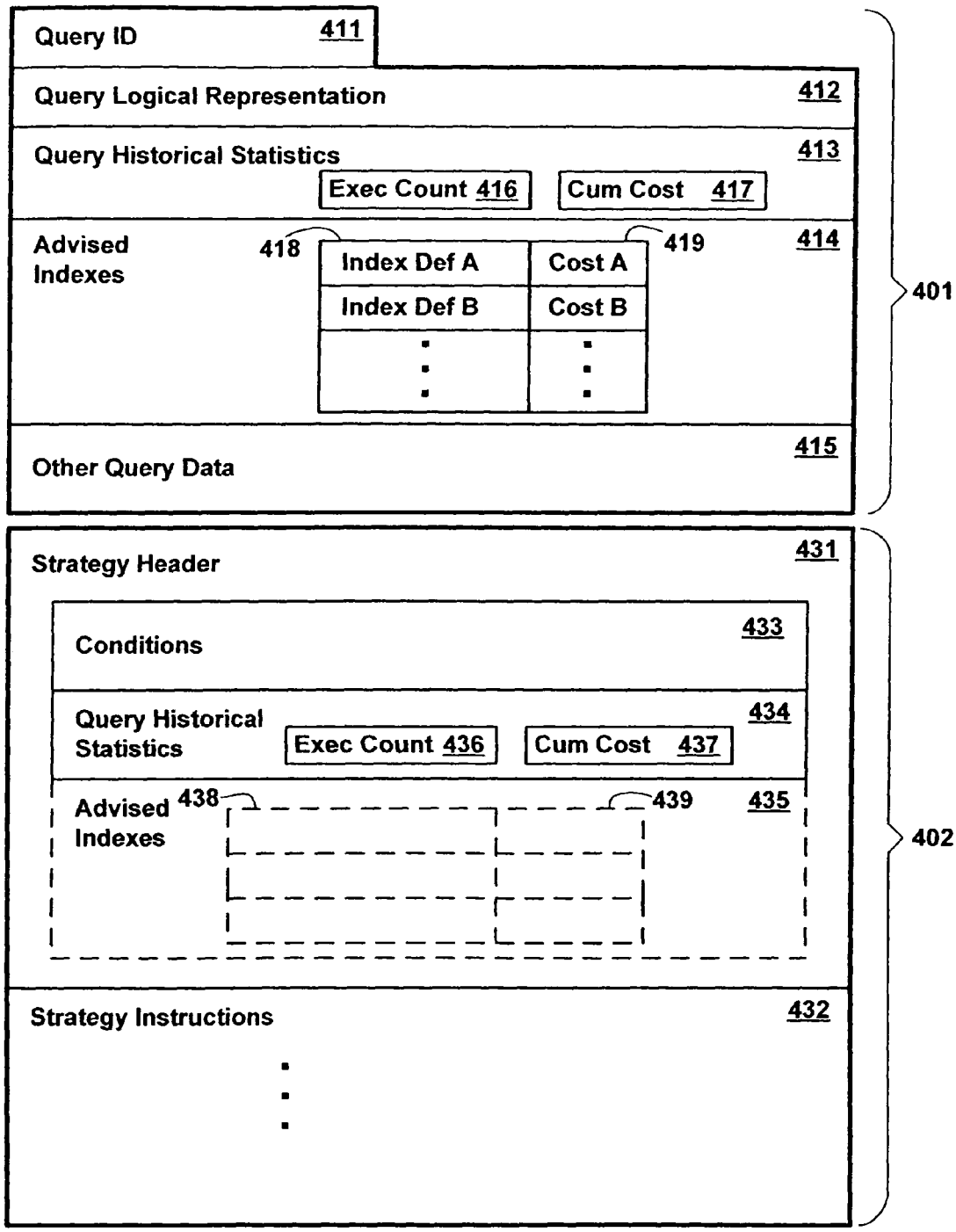
FIG. 4 is a conceptual representation of a persistent query object of a plan cache, according to the preferred embodiment.

FIG. 4 is a conceptual representation of a typical persistent query object 212, 213 of plan cache 211, according to the preferred embodiment. A query object contains a header portion 401, and a variable number of execution strategy blocks 402 (of which one is represented in the example of FIG. 4 for clarity, it being understood that a larger number could be, and often is, present).

The header portion contains a query identifier field 411, a query logical representation 412, query historical statistics 413, advised indexes 414, and additional query data 415. The query logical representation 412 is a representation of the query in a form understandable by the query optimizer 216 and/or query engine 217, from which a query execution strategy can be constructed. Query historical performance statistics 413 include historical performance data concerning previous executions of the query. Preferably, historical statistics includes at least a query execution count 416 recording the number of times the query has been executed, and a cumulative "cost" of execution 417. Cost may be any appropriate measure of the resources used and/or time consumed, such as an interactive response time, a number of CPU cycles, a number of I/O operations, etc, and could be a combination of such factors. There could be multiple "cost" fields representing different respective elements of the "cost" of a query. An average "cost" may be obtained by dividing the cumulative cost by the number of executions. Other historical data, such as cost distributions or histograms, changes in the average cost of execution over time, etc., might also be maintained. Additional query data 415 includes various other data which might be useful to database management system 215 or other applications accessing a query. For example, additional data 415 might include a text description of the query, security and access control information, and so forth. Additional query data 415 is represented in FIG. 4 as a single block of data for clarity of illustration; however, such additional data will typically comprise multiple fields, some of which may be optional or of variable length, or may reference data in other data structures.

Advised indexes 414 includes a record of potential indexes determined by the optimizer 216 to be of use in executing the query. I.e., these are indexes which did not actually exist at the time the optimizer constructed its optimized strategy, and which, had they existed, would have been useful in constructing an optimized strategy. In the preferred embodiment, the indexes recorded in advised indexes 414 include any index which the optimizer determines would have been useful had it existed, no matter how marginal the utility of the index. This is a broader criterion than that used for generating entries 301 in index advice record 210; entries 301 generally require that some minimum threshold of utility be met. However, the advised indexes 414 could alternatively use the same criteria as used for entries 301 in index advice record 210.

Advised indexes 414 includes a respective index definition 418 of each applicable advised index, and optionally includes an associated execution cost 419 and/or additional data 420. Index definition 418 identifies by reference or defines the advised index in a manner similar to that described above with respect to index definition portion 302. Execution cost contains a measure of execution cost of the query, assuming that the hypothetical index was available for use in executing the query. Cost may be expressed as a cost saving or "delta" from actual or estimated cost without the index, or may be expressed in some other terms.

Each execution strategy block 402 contains data relating to a particular execution strategy for the query. As is known in the art of database management, the choice of an optimal query execution strategy could depend in numerous factors, including the resources allocated to a particular user or process invoking a query, the values of imported variables within the query, the state of the system, and so forth. Query optimizer 216 can generate, and database manager 215 can save, multiple query execution strategies for a given query, each appropriate for use under a different respective set of conditions. Each execution strategy block 402 corresponds to a respective execution strategy for the query.

In general, an execution strategy block 402 contains a strategy header portion 431 and a body comprising strategy instructions 432. Among other things, the strategy header 432 preferably includes one or more conditions 433 on the use of the strategy, historical performance statistics 434 for the corresponding execution strategy, and optionally, advised indexes 435 associated with the strategy.

Conditions 433 express any conditions on the use of the strategy, i.e., define the circumstances in which a given strategy (as opposed to some other strategy) is to be used to execute the query. For example, conditions 433 may include values of certain imported or "host" variables which are associated, environmental parameters, or other conditions. Historical statistics 434 may include data described above as contained in historical statistics 413 of query object header 401, but as applied only to that subset of query execution instances which invoked the corresponding strategy. For example, an execution count 436 and cumulative cost 437 would include only the number of execution instances which invoked the corresponding strategy and the cumulative cost of those execution instances. Similarly, advised indexes 435, where present, may contain data described above as contained in advised indexes 414 of the query object header 401, but as applied only to that subset of query execution instances which invoked the corresponding strategy. I.e, it would include only index definitions 438 and associated execution cost measures 439 for indexes which were advised under conditions causing the corresponding execution strategy to be used. It will be observed that different indexes may be advised under different execution conditions, so that keeping optional additional data in the strategy header 431 enables a more accurate determination of execution instances potentially affected by the advised index.

Each strategy block 402 further contains a respective set of strategy instructions 432 for executing the corresponding strategy. In the preferred embodiment, these are not directly executable code, but are higher-level instructions which are interpreted by the query engine 217 to execute the query. These instructions determine the order of searching certain tables, whether or not indexes or other auxiliary data structures are used to search the database records, and so on. In particular, these instructions may access indexes or other auxiliary database structures in order to execute the query.

Among the functions supported by database management system 215 is the making of queries against data in database 202, which are executed by query engine 217. As is known, queries typically take the form of statements having a defined format, which test records in the database to find matches to some set of logical conditions. Typically, multiple terms, each expressing a logical condition, are connected by logical conjunctives such as "AND" and "OR". Many queries use existing defined auxiliary database structure such as indexes, materialized query tables and the like to reduce the scope of execution activity. Because database 202 may be very large, having a very large number of records, and a query may be quite complex, involving multiple logical conditions, a suitable index or similar structure does not always exist for a given need. In some cases, a temporary index, which is not defined in the database, is constructed solely for the purpose of executing the query, but more often than not the cost of constructing such a temporary index outweighs its benefits, if it is assumed that it will be used only once.

In accordance with the preferred embodiment of the present invention, query optimizer 216 considers multiple hypothetical execution strategies, including strategies which may require undefined indexes (indexes not present in the database definition), and selects a best strategy by estimating a cost associated with each respective hypothetical strategy. In some cases, a strategy requiring the construction of an undefined index would have offered the lowest execution cost, but for the fact that the index does not exist and must first be constructed. A record of such occurrences is saved in the advised indexes 414 and/or 435 of the query object, and if the potential execution cost savings is sufficiently large, recorded in index advice record 210. Index advisor 220 analyzes the desirability of a hypothetical index by searching query objects 212,213 to identify those queries which could benefit from the presence of the hypothetical index. Index advisor may optionally generate additional analytical information, such as frequency of execution of the applicable queries, estimates of execution cost delta to be expected from the presence of the hypothetical index, and so forth. Analytical information thus derived is presented to the user, who is typically a database designer, administrator or similar person.

Figure 5:
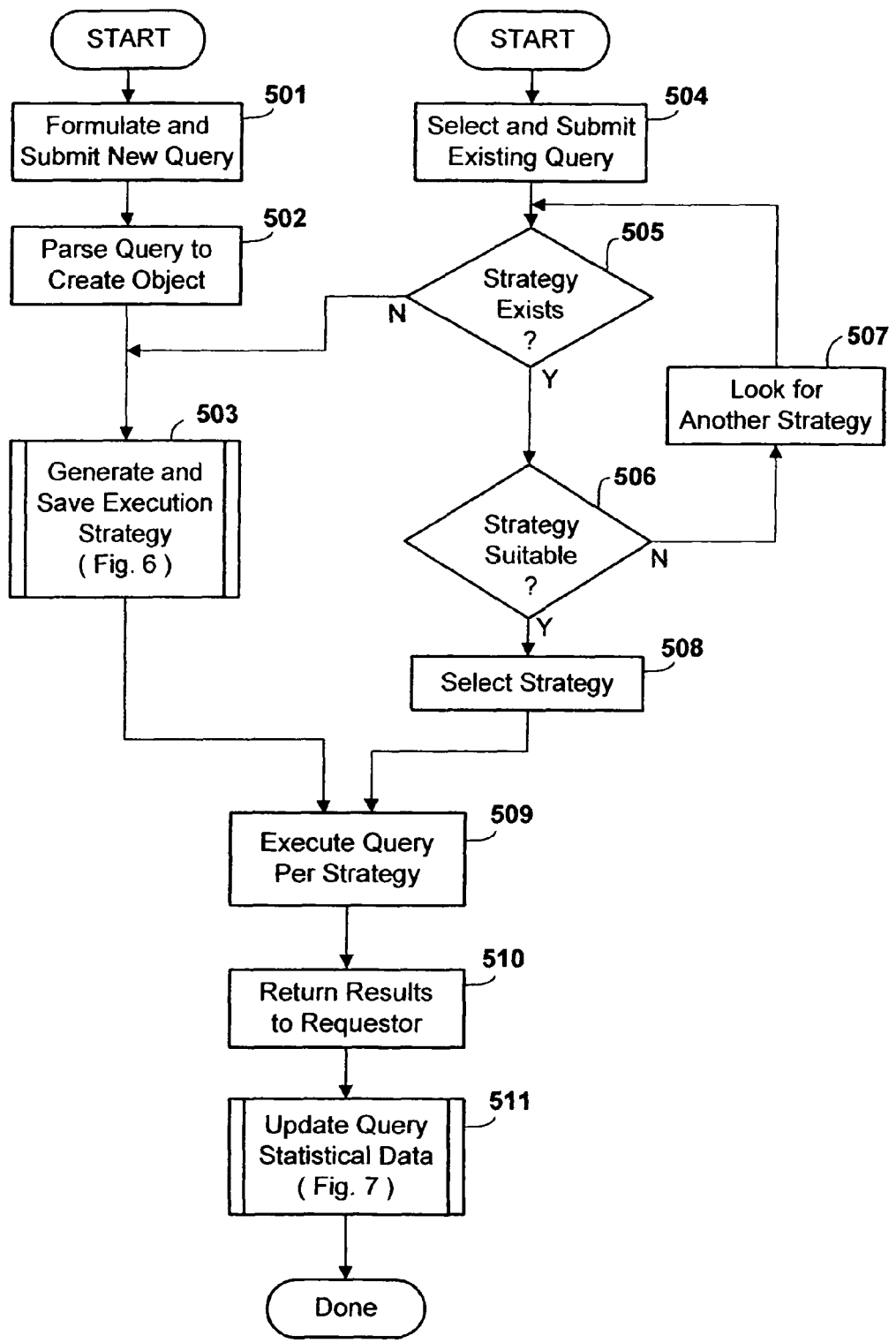
FIG. 5 is a flow diagram illustrating at a high level the process of executing a database query, according to the preferred embodiment.

FIG. 5 is a flow diagram illustrating at a high level the process of executing a database query, according to the preferred embodiment. Referring to FIG. 5, a query may be initiated either as a newly defined query, or as a re-used (previously executed and saved) query, as shown by the two paths beginning at blocks 501 and 506, respectively.

For a new query, a requesting user formulates and submits a database query using any of various techniques now known or hereafter developed (step 501). E.g., the database query might be constructed and submitted interactively using a query interface in database management system 215, might be submitted from a separate interactive query application program, or might be embedded in a user application and submitted by a call to the query engine 217 when the user application is executed. A query might be submitted from an application executing on system 100, or might be submitted from a remote application executing on a different computer system. In response to receiving the query, the system parses the query into logical conditions to generate a query object (step 502), which may be saved for re-use.

The system invokes optimizer 216 to generate an optimized execution strategy block for the query. Optimizer 216 determines an optimum execution strategy for the given query using any conventional technique or any technique hereafter developed, and may take into account imported variable values, environmental parameters, or other data. In particular, in at least some cases optimizer 216 may determine that an index or other auxiliary database structure would be useful in executing the query, and record that determination in a form which can be accessed later by index advisor 220. The process of generating an execution strategy is represented in FIG. 5 as step 503, and shown in greater detail in FIG. 6. After generation and saving of a suitable execution strategy at step 503, the database management system proceeds to step 509.

Where an existing query is re-used, a requesting user selects the existing query object for re-use and invokes it, using any of various techniques now known or hereafter developed (step 504). E.g., the query might be selected interactively from a menu in database management system 215, might be submitted from a separate interactive application program, or might be embedded in a user application and submitted by a call to the query engine 217 when the user application is executed, any of which might be performed from system 100, or from a remote system. Re-using an existing query may require specifying one or more imported variable values or other conditions of execution In response to invoking the query, query optimizer 216 determines whether a saved strategy exists in the query object 210 (step 505). If no such strategy exists (the 'N' branch from step 505), the optimizer generates one (step 503), as in the case of a new query. If a previously saved execution strategy exists for the query (the 'Y' branch from step 505), the optimizer determines whether the saved execution strategy is suitable for use under the execution parameters of the current query instance (step 506). This determination may be made using any appropriate technique, now known or hereafter developed, but in general the optimizer accesses certain data in header 431 associated with the query execution strategy, which were saved when the strategy was initially generated, to determine whether the existing strategy can be re-used for the current execution parameters (e.g., imported variable values, system configuration, database configuration etc. If the saved execution strategy is not suitable for use in the current query instance, then the 'N' branch is taken from step 506, and the database management system looks for another previously saved execution strategy (step 507), continuing then to step 505. The database management system continues to look for execution strategies (loop at steps 505-507) until a suitable strategy is found (the 'Y' branch from step 506) or there are no more strategies (the 'N' branch from step 505).

If a suitable execution strategy is found, the 'Y' branch is taken from step 506, and the execution strategy is selected (step 508). Where multiple execution strategies are permissible (multiple strategies satisfy their respective logical conditions), the database manager will choose one of these multiple strategies. Such a choice could be based on priorities, or any criteria or technique now known or hereafter developed, or could be arbitrary. After selecting a strategy, the database management system proceeds to step 509.

The query engine is then invoked to execute the query according to the query execution strategy which was either generated at step 503 or selected at step 508 (step 509). Generally, this means that the query engine retrieves selective database records according to the query execution strategy, and evaluates the logical query conditions with respect to the selected record in an order determined by the strategy. E.g., for a conjunction of logical ANDs, each successive condition is evaluated until a condition returns "false" (which obviates the need to evaluate any further conditions) or until all conditions are evaluated. In some cases, the chosen execution strategy may require the query engine to construct an index or other auxiliary database structure for temporary use in executing the query.

The query engine then generates and returns results in an appropriate form (step 510). E.g., where a user issues an interactive query, this typically means returning a list of matching database entries for display to the user. A query from an application program may perform some other function with respect to database entries matching a query.

After execution, the database management system updates certain statistical information concerning the query. In particular, it updates historical statistics within the query object 212, 213, and where necessary, updates recommended index information in index advice record 210. The process of updating statistical information is represented generally in FIG. 5 as step 511, and is shown in greater detail in FIG. 7.

Figure 6:
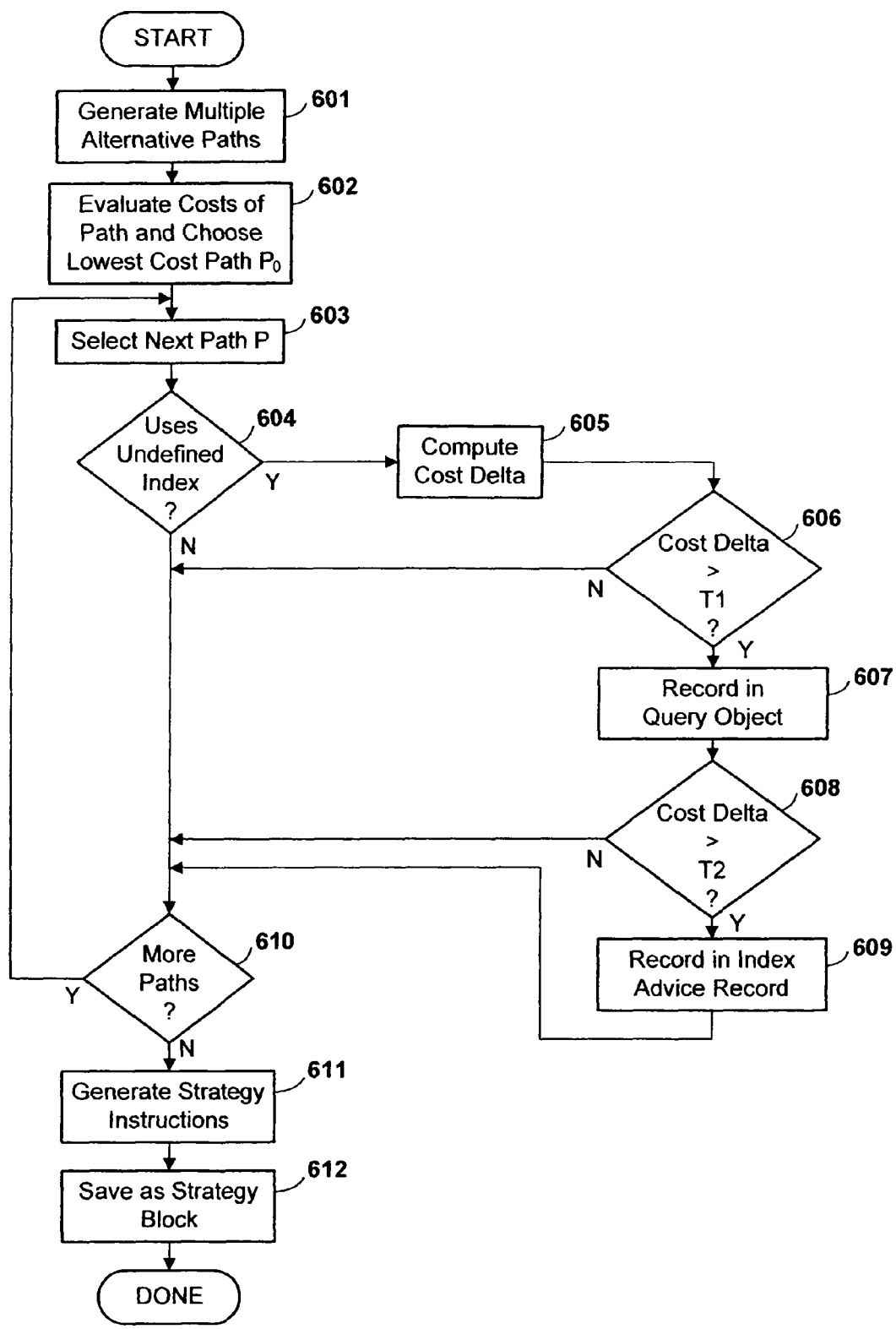
FIG. 6 is a flow diagram showing the in greater detail the process of generating and saving an execution strategy, according to the preferred embodiment.

FIG. 6 is a flow diagram showing the in greater detail the process of generating and saving an execution strategy, which is represented in FIG. 5 as step 503, according to the preferred embodiment. In general, a query optimizer considers multiple hypothetical alternative execution strategies and chooses a best one according to some evaluation criterion or criteria. These hypothetical execution strategies are referred to herein as "paths", each involving multiple execution steps.

Referring to FIG. 6, the query optimizer generates multiple alternative paths (i.e., sequences of steps) for solving the query (step 601). These may be constructed using any known technique for constructing execution steps or paths in a query or any technique hereafter developed.

Having constructed multiple alternative paths, the query optimizer chooses a best path, designated $P_0$, according to some evaluation criterion or criteria (step 602). In the preferred embodiment, the criteria involve an evaluation of projected execution cost. The "cost", as used herein, could be any appropriate measure of resource cost, and may take into account factors such as CPU utilization, storage or other I/O operations, response time, or other measures of "cost". An evaluation cost function may be constructed according to any of various conventional techniques or any technique hereafter developed.

It will be noted that some of the paths may require the use of an undefined auxiliary data structure, in particular an undefined index, and that in this case the cost of such a path will include the cost of building the auxiliary structure from scratch (because it is assumed that such a structure is for one-time use only with each query execution instance, and will be deleted after the query executes). I.e., the cost of path P which uses undefined index I can be generally expressed as:

$$\text{Cost}(P) = \text{Cost\_Exec}(P) + \text{Cost\_Build}(I) \qquad (1)$$

where Cost_Build(I) is the cost of building index I from scratch and Cost_Exec(P) is the cost of executing path P using index I, once it is available. Usually, but not always, Cost_Build(I) is sufficiently high that path P will not be chosen as the lowest cost path.

Having chosen an optimum path $P_O$, the optimizer then records potentially useful indexes, shown generally as steps 603-609. The optimizer selects a path P which was previously generated (step 603). If path P doesn't use any undefined indexes, the 'N' branch is taken from step 604, and steps 605-609 are by-passed. If path P uses an undefined hypothetical index, the 'Y' branch is taken from step 604, and a cost delta for the hypothetical index is computed (step 605). The cost delta of a hypothetical index I represents the potential execution cost saving which could be realized if the hypothetical index were present, and may be computed as the difference between the cost of path $P_O$ and the cost of execution of path P, assuming that the hypothetical index I does not need to be constructed, i.e.:

$$\text{Cost\_Delta}(I) = \text{Cost}(P_O) - \text{Cost\_Exec}(P) \qquad (2)$$

If Cost_Delta(I) does not exceed some threshold T1, then the 'N' branch is taken from step 606 and steps 607-609 are by-passed. If threshold T1 is exceeded, then a record of hypothetical index I is made in advised indexes 414 of the query object header 401 (step 607). I.e., an entry in the list of advised indexes is added corresponding to hypothetical index I, in which index definition field 418 contains the defining parameters of index I, and cost field 419 contains Cost_Delta (I) or some other appropriate measure of cost. Either alternatively or additionally, it would be possible to record hypothetical index I in advised indexes record 435 in the strategy header 431 for the strategy being constructed.

If Cost_Delta(I) does not exceed some threshold T2, then the 'N' branch is taken from step 608 and step 609 is by-passed. If threshold T2 is exceeded, then a record of hypothetical index I is made in index advice record 210, if one does not already exist (step 609). I.e., an index advice entry 301 corresponding to the hypothetical index is added to record 210 and initialized with initial values.

In the preferred embodiment, threshold T1 is zero, so that any hypothetical index producing a positive cost delta, no matter how small, will be recorded in advised indexes 414. Threshold T2 is some positive, non-zero value, so that an entry is generated in index advice record 210 only if the cost delta is sufficiently substantial. However, a different choice of T1 and T2 values could be made, and T1 could be equal to T2.

If any more paths remain to be analyzed, the 'Y' branch is taken from step 610, and a next path is selected at step 603. When all paths have thus been analyzed, the 'N' branch is taken from step 610. It will be observed that path $P_O$ is among those paths which will be analyzed at steps 603-610, and that $P_O$ could be a path which requires an undefined index to be generated.

The optimizer generates a set of execution strategy instructions for implementing steps of path $P_O$ (step 611); these execution strategy instructions will be used by the query engine 217 when executing the query. The set of execution strategy instructions generated at step 611 are saved as a new strategy block 402 in the query object, along with any required header information (step 612).

Figure 7:
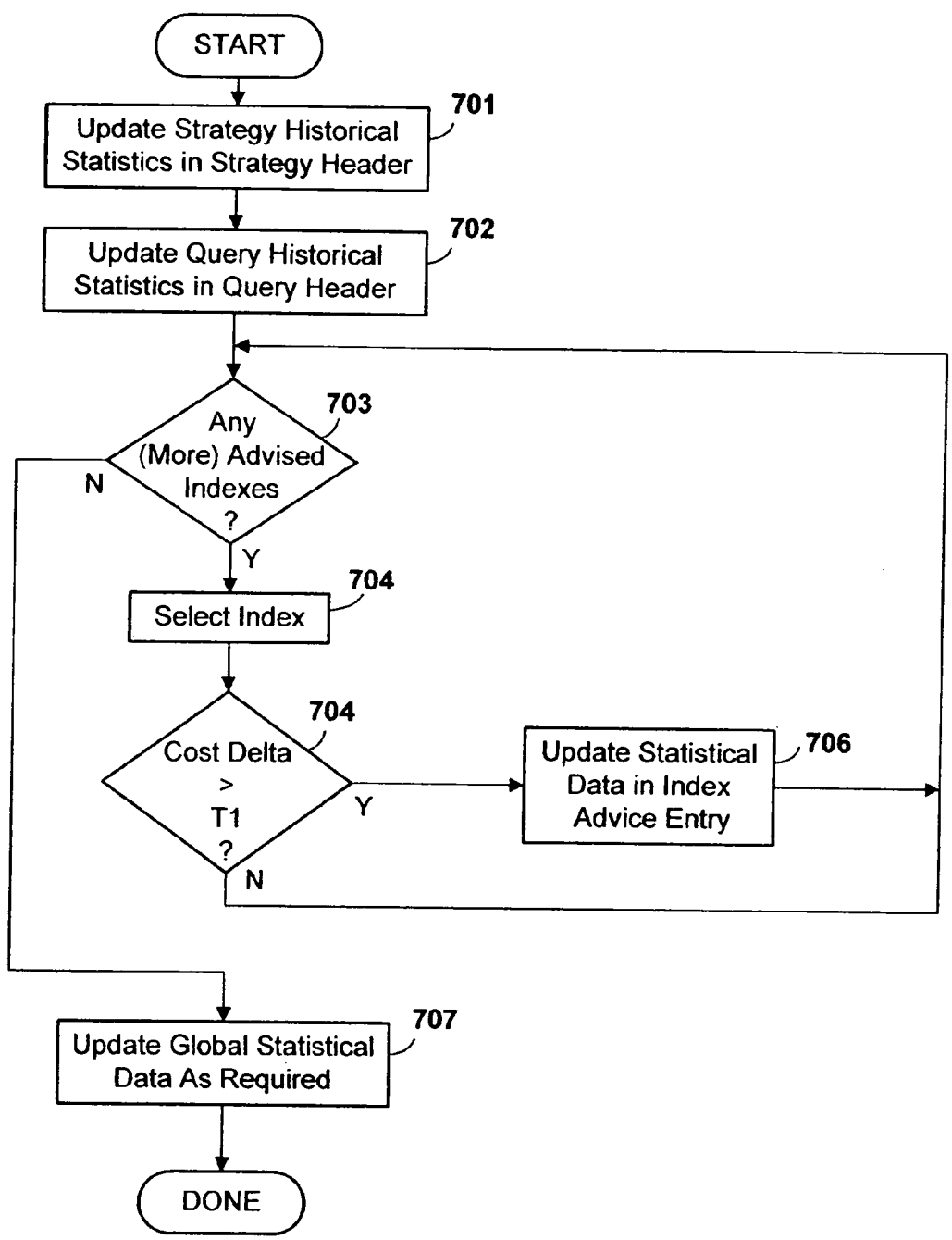
FIG. 7 is a flow diagram showing the in greater detail the process of updating query statistical data, according to the preferred embodiment.

FIG. 7 is a flow diagram showing the in greater detail the process of updating query statistical data, which is represented in FIG. 5 as step 511, according to the preferred embodiment. Relevant statistical data may be maintained in several places. In particular, the database manager updates strategy historical statistical data 434 in the strategy block 402 for the strategy just executed (step 701). For example, the execution count 436 is incremented by one, cumulative cost 437 is incremented by the actual cost measure of the execution, and any other statistics are updated appropriately. The database manager further updates query historical statistics 413 in query object header 401 in a similar manner (step 702).

The database manager further updates index advice record 210 as required. If there are any entries in advised indexes 414 of the query header 401 (or alternatively, in optional advised indexes 435 of the strategy header 402, if such a record exists) then the 'Y' branch is taken from step 703 and a next index is selected from the advised indexes (step 704). If the cost delta 419 (or alternatively in field 439) associated with the selected index is exceeds threshold T1, then the 'Y' branch is taken from step 705, and the database manager updates statistical data 303 in the index advice entry 301 of index advice record 210 which corresponds to the selected index. I.e., execution count 310 is incremented by one, and any additional statistical data 311 is updated as appropriate.

The database manager thus cycles through all indexes in the advised indexes 414 (or alternatively advised index 435). When all indexes have been considered, the 'N' branch is taken from step 703. The database manager updates any statistical information which is maintained on a global or other basis (step 707). In most large databases, a substantial amount of statistical information is maintained with respect to the performance of the database as a whole, use of certain database components, and so forth. Such information may be complex, and the details of such information are not essential to an understanding of the present invention. Updating of such information is represented generally as step 707.

The maintenance of certain underlying information regarding query performance and the use of indexes is described generally above with respect to FIGS. 5-7. Index advisor 220 accesses this underlying information to formulate and present index advice to a user. Certain aspects of the operation of index advisor 220, and particularly the presentation of information contained in index advice record 210, are described in U.S. patent application Ser. No. 11/239,617 filed Sep. 29, 2005, entitled "CONTINUAL GENERATION OF INDEX ADVICE", herein incorporated by reference. In addition to these aspects, in accordance with the preferred embodiment index advisor includes at least one function for analyzing data in query objects 212, 213 to identify queries which would benefit from a hypothetical index. This function of the index advisor is described below with reference to FIG. 8.

Figure 8:
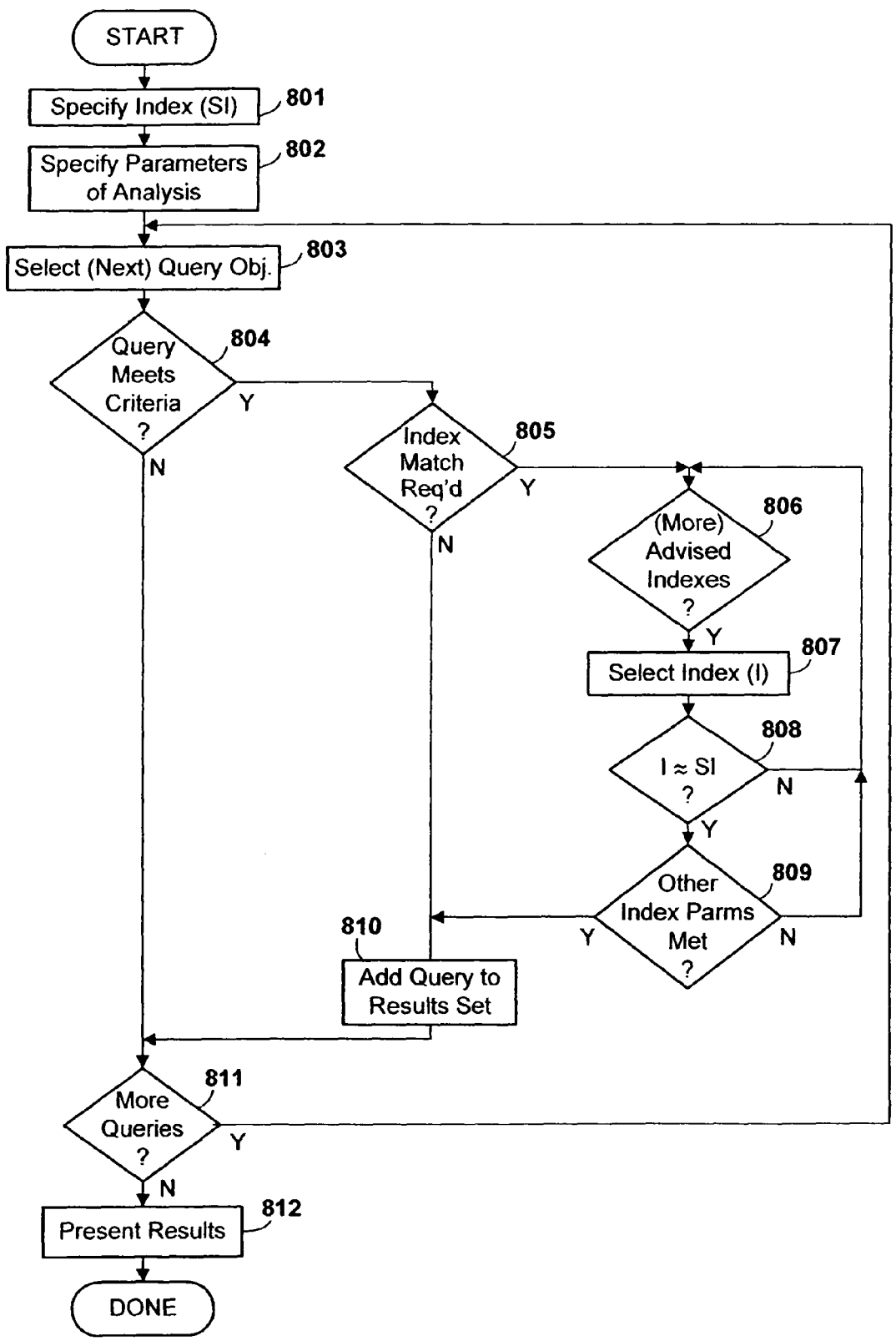
FIG. 8 is a flow diagram showing the process of analyzing query statistical and/or other data to identify queries which would benefit from a hypothetical index, according to the preferred embodiment.

Referring to FIG. 8, a hypothetical index SI is specified for analysis (step 801). A hypothetical index could be specified in any of various ways. For example, the index advisor can display a list of advised index entries from index advice record 210, and allow a user to select an index for analysis. Alternatively, the index advisor might be directed to analyze every index in the index advice record 210 in turn, and to present the results of such analysis, e.g., by sorting the various indexes according to some appropriate criterion, such as a projected total cost delta. As a further alternative, a user might specify the characteristics of any arbitrary hypothetical index and request the index advisor to analyze the hypothetical index.

The parameters of the analysis are specified, either explicitly or implicitly by default (step 802). The parameters of the analysis govern the conditions under which indexes are to be identified and the data which is to be obtained, as explained in greater detail herein.

Each query object 212,213 is then selected in turn and analyzed. A next query object is selected (step 803). If the selected query does not meet any previously specified query selection criteria, the 'N' branch is taken from step 804 to step 811, and another query (if there is one) will be selected. Query selection criteria may be optionally specified at step 802, i.e., analysis as described herein may be performed only with respect to some subset of query objects. By default, all query objects are analyzed.

The analysis may be directed solely to the properties of the query itself. For example, it may be desirable to find all queries, where the query itself references a certain table and field, on the assumption that such a query might benefit from a particular index. In this case, the 'N' branch from step 805 is taken, steps 806-809 are by-passed, and the query is added to the result set (having previously satisfied any applicable criteria at step 804). If the analysis requires a consideration of advised indexes, the 'Y' branch is taken from step 805.

If there are any unexamined entries (advised indexes) in advised indexes 414 of the header 401 of the selected query, the 'Y' branch is taken from step 806 to step 807. Alternatively, at step 806, the advised index information may be contained in advised indexes 435 of individual execution strategy blocks 402, which may require a scan of all strategy blocks within the query object. If there are no entries in the advised indexes or all entries have been examined, the 'N' branch it taken from step 806 to step 811.

A next index I from the advised indexes 414 (or alternatively advised indexes 435) is selected (step 807). The selected index I is then compared with specified hypothetical index SI (step 808). If the two are identical or sufficiently close, the 'Y' branch is taken to step 809; otherwise the 'N' branch is taken to step 806, and another unexamined index I is selected if there is one. Variable criteria can be used for the comparison at step 808, these criteria being specified earlier at step 802. Of course, if there is an exact identity of index I and SI, they will compare. But in many cases, a close match is sufficient. For example, if an advised index record in a query contains an index of Table_A which is sorted on Col1, Col2 and Col3 in that order, it is likely that the query would also benefit from a hypothetical index of Table_A which is sorted on Col1, Col3 and Col2, in that order. In accordance with the preferred embodiment, the index advisor may accept a close match such as this as an equivalence for purposes of determining queries which are likely to benefit from the hypothetical index. Preferably, the user may specify some degree of closeness required in performing the analysis, and may require a strict identity of matching indexes, or may use one or more looser criteria (e.g., table and primary column matches)

If the selected index I matches the hypothetical index SI under analysis, the advisor considers whether any other criteria specified at step 802 are met (step 809). Such additional criteria are optional, and it might be that no such additional criteria are specified. Additional criteria could include, e.g., a minimum or threshold value of a cost delta, a minimum or threshold number of execution instances of the query (or query strategy, as the case may be), or some other criteria. If any required additional criteria are met, the 'Y' branch is taken from step 809, and the selected query is added to a cumulative results set (step 810); otherwise the 'N' branch is taken back to step 806. Adding the selected query to the result set may be as simple as adding the query to a list of queries which would benefit from the hypothetical index, but it may involve more sophisticated data analysis. Specifically, in one alternative a projected cost saving from using the hypothetical index for executing the added query is computed from the cost delta and frequency of execution of the query. A total projected cost saving resulting from the hypothetical index can be computed as the sum of the cost savings of individual queries. Other forms of analytical data can also or alternatively be derived and compiled.

When all advised index entries in a query record have been thus analyzed, the 'N' branch is taken from step 806. If any more queries remain in the plan cache, the 'Y' branch is taken from step 811, and a next query object is selected at step 803. When all queries have been analyzed, the 'N' branch is taken from step 811. The results set and any analytical data thus derived is presented to the user (step 812). By "presenting" data to the user, it is meant that the data is made available to the user. Data can be presented by interactive display, by printing on paper or other readable medium, by placing the data in an electronic file from which it can be retrieved, by transmitting the data to some other digital device, etc.

Although steps 801-812 are described herein as being performed by the advisor, in fact in the preferred embodiment the advisor invokes search functions of database management system 215 through metadata interface 218 to retrieve the required data. However, these steps could be implemented entirely in the advisor, or the advisor functions could be integrated into database management system 215.

Among the advantages of the technique described herein as a preferred embodiment is that useful data which can be used to more accurately project cost savings of a hypothetical index can be obtained. Furthermore, because the underlying data is normally generated anyway during the process of optimizing and executing queries, it is merely necessary to save this underlying data in appropriate form for use by the advisor. Relatively little overhead is involved in saving this underlying data, and very useful information regarding the effect of hypothetical indexes can be obtained as a result.

In the preferred embodiment described above, the generation and execution of the query, and the projected benefit of an index, is described as a series of steps in a particular order. However, it will be recognized by those skilled in the art that the order of performing certain steps may vary, and that variations in addition to those specifically mentioned above exist in the way particular steps might be performed. In particular, the manner in which queries are written, parsed or compiled, and stored, may vary depending on the database environment and other factors.

In the preferred embodiment described above, it has been assumed for purposes of clarity that all data, regardless of age, is equal. In fact, databases typically evolve over time, and their characteristics may change. Index advice data or similar data may be appropriately aged on a periodic basis so that more recent data is given greater weight in any analysis than older data. Various techniques for aging data are known in the art.

In the preferred embodiment described above, analysis is performed for the purpose of identifying hypothetical indexes which might be useful. It would alternatively be possible to perform similar analysis for the purpose of identifying existing, defined database indexes which are not sufficiently useful to justify their maintenance cost, and to recommend removal of such indexes from the database definition.

In general, the routines executed to implement the illustrated embodiments of the invention, whether implemented as part of an operating system or a specific application, program, object, module or sequence of instructions, are referred to herein as "programs" or "computer programs". The programs typically comprise instructions which, when read and executed by one or more processors in the devices or systems in a computer system consistent with the invention, cause those devices or systems to perform the steps necessary to execute steps or generate elements embodying the various aspects of the present invention. Moreover, while the invention has and hereinafter will be described in the context of fully functioning computer systems, the various embodiments of the invention are capable of being distributed as a program product in a variety of forms, and the invention applies equally regardless of the particular type of computer-readable data storage media used to actually carry out the distribution. Examples of computer-readable data storage media include, but are not limited to, volatile and non-volatile memory devices, floppy disks, hard-disk drives, CD-ROM's, DVD's, magnetic tape, and so forth. Furthermore, the invention applies to any form of signal-bearing media regardless of whether data is exchanged from one form of signal-bearing media to another over a transmission network, including a wireless network. Examples of computer-readable data storage media are illustrated in FIG. 1 as system memory 102, and as data storage devices 125-127.

Although a specific embodiment of the invention has been disclosed along with certain alternatives, it will be recognized by those skilled in the art that additional variations in form and detail may be made within the scope of the following claims:

What is claimed is:

1. A method for managing a database in at least one computer system, comprising computer-executed steps of:
    maintaining, in the at least one computer system, a historical record of a set of queries which have been executed against said database, said historical record including, with respect to each of a plurality of executed query instances, that a respective temporary auxiliary database structure was generated to execute the respective query instance, said historical record being maintained by an automated process executing in said at least one computer system;
    maintaining, with respect to each query of a plurality of queries of said set of queries, a respective record of a set of hypothetical auxiliary database structures which would be useful in executing the respective query;
    receiving a specification of a first auxiliary database structure, wherein said first auxiliary database structure is a hypothetical auxiliary database structure which is not defined as part of said database;
    responsive to receiving a specification of said first auxiliary database structure, using said at least one computer system to access said historical record and to determine a subset of said set of queries therefrom, wherein each respective query of said subset is projected to execute more efficiently using said first auxiliary database structure than the respective query is projected to execute without using said first auxiliary database structure, said subset including each query of said set of queries for which a respective temporary auxiliary database structure matching said first auxiliary database structure was generated to execute one or more query instances of the respective query, wherein said step of determining a subset of said set of queries comprises examining each record of a plurality of said records of a set of hypothetical auxiliary database structures and identifying any queries for which the corresponding record of a set of hypothetical auxiliary database structures contains a hypothetical auxiliary database structure matching said first auxiliary database structure; and
    presenting data derived from results of said step of using said historical record to determine a subset of said set of queries to a user.

2. The method for managing a database of claim 1, wherein said first auxiliary database structure is an index.

3. The method for managing a database of claim 1, wherein said step of presenting data comprises presenting a list identifying each query of said subset of said set of queries determined by said step of determining a subset of said set of queries.

4. The method for managing a database of claim 1, wherein said step of presenting data comprises presenting a projected cost delta associated with at least one query of said subset of said set of queries determined by said step of determining a subset of said set of queries.

5. The method for managing a database of claim 1, wherein said step of identifying any queries for which the corresponding record of a set of hypothetical auxiliary database structures contains a hypothetical auxiliary database structure matching said first auxiliary database structure comprises matching said auxiliary database structure according to at least one user-specified matching criterion.

6. The method for managing a database of claim 1,
    wherein said step of determining a subset of said set of queries comprises examining each of a plurality of queries of said set of queries and identifying any queries against data with which said first auxiliary database structure is associated.

7. A computer program product recorded on a computer-readable data storage medium for managing a database in at least one computer system, said at least one computer system including a record of a set of queries which can be executed against said database, said program product comprising:
    a plurality of computer-executable instructions, when executed by at least one computer system, cause the at least one computer system to perform the steps of:
    maintaining a historical record of a set of queries which have been executed against said database, said historical record including, with respect to each of a plurality of executed query instances, at least one of (a) that a respective temporary auxiliary database structure was generated to execute the respective query instance, and (b) that a database optimizer, while determining an optimal query execution strategy for the respective query instance prior to executing the respective query instance, determined that the database optimizer would have used a respective hypothetical auxiliary database structure to optimally execute the respective query instance if the respective hypothetical auxiliary database structure had existed, wherein said record of a set of queries comprises, with respect to each query of a plurality of queries of said set of queries, a respective record of a set of hypothetical auxiliary database structures which would be useful in executing the respective query;
    receiving a specification of a first auxiliary database structure, wherein said first auxiliary database structure is a hypothetical auxiliary database structure which is not defined as part of said database;
    responsive to receiving a specification of said first auxiliary database structure, using said historical record to determine a subset of said set of queries, wherein each respective query of said subset is projected to execute more efficiently using said first auxiliary database structure than the respective query is projected to execute without using said first auxiliary database structure, said subset including each query of said set of queries for which at least one of: (a) a said temporary auxiliary database structure matching said first auxiliary database structure was generated to execute a query instance of the respective query, and (b) said database optimizer, while determining an optimal query execution strategy for a query instance of the respective query prior to executing the query instance, determined that the database optimizer would have used a hypothetical auxiliary database structure matching said first auxiliary database structure to optimally execute the query instance of the respective query if the hypothetical auxiliary database structure had existed, wherein said step of determining a subset of said set of queries comprises examining each record of a plurality of said records of a set of hypothetical auxiliary database structures and identifying any queries for which the corresponding record of a set of hypothetical auxiliary database structures contains a hypothetical auxiliary database structure matching said first auxiliary database structure; and presenting data derived from results of said step of using said historical record to determine a subset of said set of queries to a user.

8. The computer program product of claim 7, wherein said first auxiliary database structure is an index.

9. The computer program product of claim 7, wherein said step of presenting data comprises presenting a list identifying each query of said subset of said set of queries determined by said step of determining a subset of said set of queries.

10. The computer program product of claim 7, wherein said step of presenting data comprises presenting a projected cost delta associated with at least one query of said subset of said set of queries determined by said step of determining a subset of said set of queries.

11. The computer program product 7, wherein said step of identifying any queries for which the corresponding record of a set of hypothetical auxiliary database structures contains a hypothetical auxiliary database structure matching said first auxiliary database structure comprises matching said auxiliary database structure according to at least one user-specified matching criterion.

12. The computer program product of claim 7,
wherein said step of determining a subset of said set of queries comprises examining each of a plurality of queries of said set of queries and identifying any queries against data with which said first auxiliary database structure is associated.

* * * * *